US008454171B2

(12) United States Patent
Ivashin

(10) Patent No.: US 8,454,171 B2
(45) Date of Patent: Jun. 4, 2013

(54) METHOD FOR DETERMINING A VIDEO CAPTURE INTERVAL FOR A CALIBRATION PROCESS IN A MULTI-PROJECTOR DISPLAY SYSTEM

(75) Inventor: Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 13/070,239

(22) Filed: Mar. 23, 2011

(65) Prior Publication Data

US 2012/0242910 A1 Sep. 27, 2012

(51) Int. Cl.
*G03B 21/00* (2006.01)
*G03B 3/00* (2006.01)

(52) U.S. Cl.
USPC ................. 353/69; 353/70; 353/94; 353/121; 353/122

(58) Field of Classification Search
USPC ................ 353/69, 70, 94, 121, 122; 348/189, 348/383
See application file for complete search history.

(56) References Cited

U.S. PATENT DOCUMENTS

| | | | | |
|---|---|---|---|---|
| 7,133,083 | B2 * | 11/2006 | Jaynes et al. | 348/745 |
| 8,355,601 | B2 * | 1/2013 | Ding et al. | 348/189 |
| 2007/0133794 | A1 * | 6/2007 | Cloutier et al. | 380/200 |
| 2007/0171380 | A1 * | 7/2007 | Wright et al. | 353/69 |
| 2007/0291184 | A1 * | 12/2007 | Harville et al. | 348/745 |
| 2007/0291185 | A1 * | 12/2007 | Gelb et al. | 348/745 |
| 2008/0036785 | A1 * | 2/2008 | Jeong et al. | 345/589 |
| 2008/0043209 | A1 * | 2/2008 | Widdowson et al. | 353/94 |
| 2009/0115915 | A1 * | 5/2009 | Steinberg et al. | 348/745 |
| 2011/0176007 | A1 * | 7/2011 | Ding et al. | 348/189 |

* cited by examiner

*Primary Examiner* — Francis M Legasse, Jr.
*Assistant Examiner* — Bao-Luan Le

(57) ABSTRACT

First, a delivery delay, i.e. the time it takes for a content to be captured and a representative frame made available (i.e. delivered), is determined. Second, a video capture interval, i.e. a minimum time delay requirement between stable captured content frames, is determined. In other words, the recycle time-period after which it is safe to change frame content during a capture interval without impacting a prior stable video frame in the pre-delivery stage is determined.

20 Claims, 7 Drawing Sheets

METHOD FOR DETERMINING A VIDEO CAPTURE INTERVAL FOR A CALIBRATION PROCESS IN A MULTI-PROJECTOR DISPLAY SYSTEM

CROSS-REFERENCE TO RELATED APPLICATIONS

This application is related to commonly owned U.S. patent application Ser. No. 12/728,838, filed Mar. 22, 2010, and Ser. No. 12/549,011, filed Aug. 27, 2009, which are hereby incorporated by reference in their entirety.

FIELD OF INVENTION

The present invention relates generally to multi-projector display systems. More particularly, the present invention relates to accurate calibration of the system during registration of each of the multiple projectors.

BACKGROUND

With an ever growing desire to see more information with better quality, large-screen displays have become quite popular. Increasing screen resolutions and sizes are continually emerging and made available in televisions, computer monitors, and other video devices. Until recently, large screen displays were typically too costly, physically unwieldy, or simply unavailable. Video projectors provided one solution, enabling a wide range of communication and entertainment functions by offering a significantly greater display area relatively inexpensively. These devices have found application in conference rooms for presentations, home theaters, classroom training, and advertising billboard displays.

Similar to other video device technologies, video projectors continue to advance their displayable pixel resolution and light output. Today commodity projectors are brighter, offer better quality, and are often less expensive than those of prior years. Highly portable projectors (in both weight and size) are also becoming readily available. No longer do commodity projectors remain constrained to dimly lit rooms with well prepared display surfaces. A video projector's small physical size relative to its large projection output therefore remains appealing.

Even with these improvements, however, it is still difficult or impossible for a single commodity projector to achieve very high resolutions, project over vast areas, or create bright projections on very bright surface areas (for example, near day lit windows). Applications demanding such display qualities, however, are becoming more desirable. The benefits of increased resolution, brightness, and larger display surface area have proven useful for reaching larger audiences and providing full-scale life-sized immersive environments. Unfortunately, construction of such large displays is complex and costly.

One common technique, such as grouping multiple projectors together and tiling their projection output to produce large screen displays of any desired size, presents challenging problems with registration (that is, alignment of projector pixels). Color and luminosity variance across separate devices and even within a given device is difficult to correct. Minor shape or geometric inconsistencies of the display surface can also hinder adequate results. Projector lumens, or light output, may not be adequate for brighter locations. Synchronizing content delivery to the individual components forming the larger display are additional hurdles to solve. Some of these problems apply to single-projector displays as well.

Solutions to some of these system problems take many forms. Many require precise pixel and color alignment using manual methods that require physical adjustment of the projector placement. If the output pixels from one projector are not close enough to those from another projector, a visible gap may occur between the projections on the composite display. Likewise, overlapping pixels across projectors produce bright seams that are also objectionable. High-end projectors with specialized lens optics or edge blending/blurring filters may be available to reduce some of these problems, but are far from optimal.

Specialized projectors and mounting hardware, measurement tools, and tedious calibration methods are additional requirements that add to the resource costs and complexities of physical projector alignment which can become too demanding for the average user. The advanced skills and time requirements are more than most will invest. In many configurations, physical alignment may even be impossible using projectors with limited optic pathways, or with even slightly irregular display surfaces. When changes are necessary to replace failed lamps, the calibration methods often need repeating.

What is needed is a system that provides an easy calibration and playback mechanism offering the typical user an automated method to create a composite display from one or more commodity projectors, even in the presence of high ambient light levels. This method should offer a relatively quick one-time calibration function to be performed once after casual projector placement or changes. Commonly owned U.S. patent application Ser. No. 12/728,838, entitled "Multi-projector display system calibration" describes such a one-time calibration system.

Digital still cameras are often used by multi-projector display systems (such as the one described in U.S. patent application Ser. No. 12/728,838) to gather input for a calibration process. These cameras can capture high-resolution images of the environment for detailed measurement and analysis. Exposure settings may be accurately configured and the capture event (exposure) can be directly initiated or otherwise controlled by remote shutter signaling or the like. The moment of exposure is thus deterministic (or occurring after shutter signaling) and the single received frame result marks the end of a capture interval. Therefore, a process requiring many exposures of varied content can be easily and optimally automated, as in a loop: prepare a content, capture a content, receive captured result, repeat.

Digital still cameras, however, may exhibit slow recycle times between exposures. Recycle time may be slowed by internal processing of high-resolution image content or transfer and data storage of large frame data. This can diminish the performance of a calibration capture function in a calibration processing step. Additionally, it decreases the capability to quickly position a camera properly, toward a calibration display, as the time to gather multiple frames and determine an acceptable orientation of the camera's view is lengthened.

In a multi-projector system (such as the one described in U.S. patent application Ser. No. 12/728,838), an inexpensive webcam is used instead of a more costly digital still camera. Higher frame rates often enable user interfaces with video feedback to aide positioning of the camera and aligning its view with a display surface. Lower device resolutions may lead to diminished storage requirements. Because the video frame rate can be fast, it is possible to shorten the time for a calibration test pattern capture process. However, using a video device to capture calibration content presents several challenges. With a webcam, there is generally less control of exposure settings and exposure notification compared with a still camera. Limited methods to adjust an aspect of an exposure sensitivity setting may indirectly change a video frame rate or a noise characteristic. Capture methods tend to require more complex interfaces like asynchronous delivery of a continuous sequence, or stream, of captured frames.

Some video cameras and webcams are configurable to capture still images by using internal resolution enhancement or frame averaging methods to deliver higher resolution frames. If the quality and performance is acceptable for a calibration process, then the still image interfaces may be used.

However, when video devices are used and a contiguous stream of captured frames is arriving at a calibration process, one key challenge is determining when a delivered frame will contain a known element captured by the device. Additionally, it is difficult to determine when a change to a known element for capture by the device can be made without impacting a previously captured element in an as yet to be delivered frame.

For example, a calibration process requires that views of several calibration test patterns be captured and stored for future processing. The process begins with outputting a calibration test pattern onto a display surface. With a still camera, a signaling event sent after the calibration test pattern is displayed begins the capture operation. After the exposure event (when the camera captured content is determined to be complete through notification, detection of delivery to a storage media, transmission from the camera to the calibration process, or a known exposure interval), the process continues for a next calibration test pattern. With a webcam, there is no exposure signaling. The video capture process is started (or already active) and it is initially unknown which frame in a delivery sequence contains the expected capture of the calibration test pattern.

Contributing to the delivery delay and uncertainty are variables including time to enable a video capture process, frame buffers in the device or in a driver, data compression or decompression, transmission time, slow gain or frame averaging methods, and other delays between the actual frame capture event and the location of frame access, etc. It is equally unclear when to display a next calibration test pattern as changes to display content mid-frame (i.e. at the interval of video frame capture), can yield unexpected results within the frame.

Accurate frame rate and timestamp information may not be available from the webcam device. Even if a frame rate is well controlled and identified, it alone is insufficient to determine the frame delay between a capture time and a delivery time or the time between a signaling to start and the actual start of a capture stream. Frame timestamps, if available and associated with a capture process clock, can help to determine the delivery delay, but cannot be used alone to determine how quickly capture content can be safely changed.

SUMMARY OF INVENTION

The present invention is directed to the problems described above. First, the present invention determines a delivery delay interval, the time it takes for a projected content to be captured and a representative frame made available. Second, it determines a minimum time delay requirement between stable captured content frames, i.e. a video capture interval. In other words, the recycle time-period after which it is safe to change projected content during a capture interval without impacting a prior stable video frame in the pre-delivery stage is determined.

As a component of a calibration process in a multi-projector display system, the present invention determines a delay interval between display of a detection pattern and retrieval of a video frame containing a captured view of the detection pattern from a capture device video stream and where the delay interval is a minimum. The present invention further determines a video capture interval which specifies the minimum time needed for a capture device to stabilize a change in a captured detection pattern onto a video frame. These intervals are used by a calibration process to capture views of a set of calibration test patterns.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention relates to camera-based registration of projector display systems. During registration, one or more projectors project calibration images upon a display surface. A camera captures one or more images of each projected calibration image. A projector platform creates a mapping, for each projector, between pixel locations of the camera and pixel locations of the projector. After registration, the mappings are used to alter the images prior to projection so that seamless composite image can be displayed by the multiple projectors.

These mappings are stored in Virtual Pixel Map (VPM) files that form an accurate pixel registration map of each projector. Using the VPM files, each physical device pixel on a projector can be mapped to one or more logical pixels in a virtual region defining the large format display (composite image). This virtual large format display resolution defines the unit of each VPM pixel, which is a virtual pixel in the logical display region. It also defines the relative location of VPM pixels on one device relative to VPM pixels on another. The bounded display region represents a homogenous portion of the logical display region within which every pixel is addressable by at least one physical device pixel.

In order to project what appears to be a single continuous image, each individual projector's intrinsic and extrinsic parameters must all be in a common coordinate frame. This enables multiple projectors to generate a rectangular image of known aspect ratio. Projector platform 106, discussed below, performs registration of the projectors to create an accurate pixel registration map of each projector.

The registration process can use one or both of two techniques to create the mappings. According to the first technique, a coarse mapping is created for each projector using striped calibration images, which can be generated using Gray codes. This technique can establish a mapping to within approximately sixteen pixels. According to the second technique, raster calibration images are used. When both techniques are used, a precise mapping can be created between pixel locations of the camera and pixel locations of the projector. The mappings can be used for correcting projection distortions such as keystoning, aligning multiple projections, and the like. The first technique of using Gray codes is discussed in commonly assigned U.S. patent application Ser. No. 12/728,838, filed Mar. 22, 2010, which is hereby incorporated by reference in its entirety. The second technique is discussed in commonly assigned U.S. patent application Ser. No. 12/549,011, filed Aug. 27, 2009, which is hereby incorporated by reference in its entirety.

Figure 1:
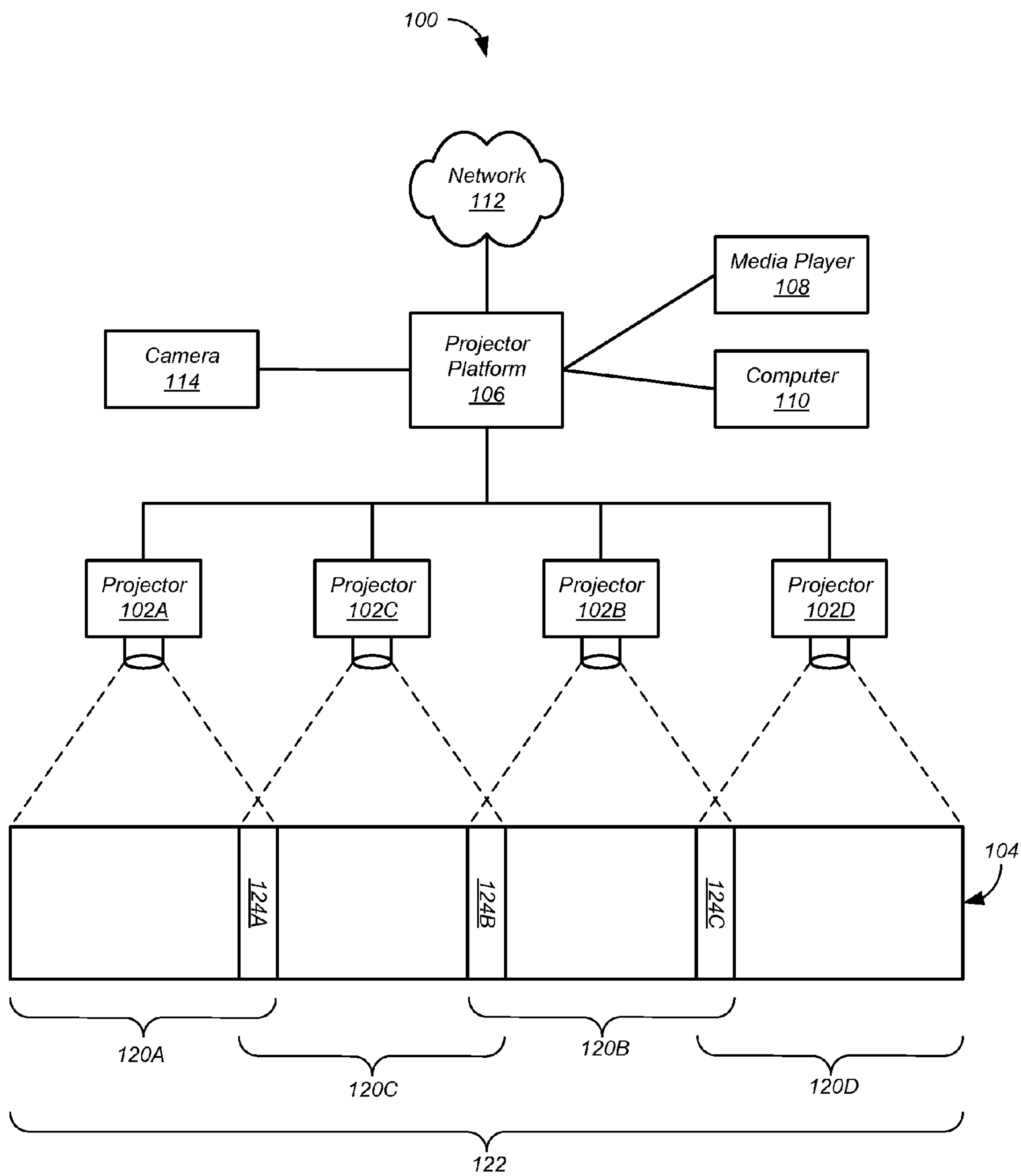
FIG. 1 is a general block diagram of the system of the present invention.

FIG. 1 shows a multi-projector display system 100 according to an embodiment of the present invention. System 100 includes four projectors 102A-102D aimed at a display surface 104. Of course, other numbers of projectors 102 can be employed. For example, two projectors 102 can be used. Data is provided to projectors 102 by a projector platform 106, which can obtain source input from a media player 108, a computer 110, a source connected by a network 112 such as the Internet, and the like. For calibration, system 100 includes a video camera 114 (e.g. a webcam).

In an embodiment, system 100 includes four projectors 102, and a projector platform 106 that is implemented as a personal computer (PC) configured with a central processing unit (CPU) and graphic processing units (GPU) providing four video outputs, each connected to one of projectors 102. An optional capture card provides video input from sources such as computer 110, media player 108, and the like. A video camera 114 is attached to the PC for the calibration process. In other embodiments, a digital still camera may be used for the calibration process. After calibration, camera 114 may be removed or used as a media input device by projector platform 106.

Projectors 102A-102D produce respective component projections 120A-120D upon display surface 104. Together component projections 120A-120D form a single composite projection 122. Note that component projections 120 overlap in regions 124A-124C.

Unless specified otherwise, the method or steps discussed with respect to the present invention are performed by the projector platform 106, which as mentioned above, is implemented as a personal computer (PC) configured with a central processing unit (CPU) and graphic processing units (GPUs). One or more of the processing units or "processors" is used to execute the method or steps under control of software or firmware stored in memory in the PC or in an external memory such as computer-readable media.

As mentioned above, the registration process can use one or both of two techniques to create the mappings. A detailed discussion of these techniques is not required to understand or use the present invention. However, these techniques are described in detail in commonly owned U.S. patent application Ser. No. 12/728,838, filed Mar. 22, 2010, and Ser. No. 12/549,011, filed Aug. 27, 2009, which are hereby incorporated by reference in their entirety.

A calibration capture process includes a video camera 114 configured to capture a set of calibration test patterns each projected sequentially onto a display surface 104. Captured frames associated with each calibration test pattern are required by a future calibration processing step. The count of calibration test patterns and a rate of capture determine the duration of the calibration capture process. Ideally, this duration is a minimum. Finding the parameters that can be used to approach this minimum is one goal of the present invention. These parameters include a determination of a delivery delay interval and a video capture interval.

In general terms, a capture process is a loop: project a pattern, sample (capture) the pattern, store the sample result, and repeat for all patterns. A digital still camera is one device that can capture and provide a single representative sample (frame) when requested. However, video devices provide a continuous stream of frames and introduce a continual frame video capture method asynchronous to the capture process loop. This is often implemented in a separate processing thread. It is therefore unclear when a sample (frame) is available which is a representative sample, associated with a projected pattern, and provided for storage, and thus when a new pattern can be projected in the capture process loop.

In an embodiment of a calibration process, a calibration capture process is coupled "synchronously" to the asynchronous video capture method using a delivery delay interval as determined by the present invention. In this embodiment, the calibration capture process projects a calibration test pattern, waits for a delivery delay interval, stores the latest available frame from a video capture method as the associated sample, and repeats the process for all calibration test patterns.

In another embodiment of a calibration process, a calibration capture process is coupled "asynchronously" to the asynchronous video capture method using a delivery delay interval and a video capture interval as determined by the present invention. In this embodiment, the calibration capture process is divided into two simultaneously executing components. A first component projects a calibration test pattern and places an item containing the display time (DT) and an identification labeling the associated calibration test pattern (id CTP) into a component shared calibration capture queue.

The first component continues by waiting a video capture interval before repeating the first component process for all calibration test patterns. A second component waits for items to arrive into the component shared calibration capture queue. When an initial item arrives (the first item received after the second component has started executing), the second component begins a one time initialization step which waits until the item's time DT+delivery delay interval before continuing. On subsequent item arrival, the second component waits until the item's time DT+video capture interval before continuing. The second component then starts storing the latest available frame from a video capture method as an associated sample to a calibration test pattern as indicated by the item's CTP. The second component repeats the process and returns to wait for a subsequent item to arrive.

In this method, a display surface 104 is continuously captured by a video device 114. The device capture or sampling rate, the delivery frame rate, and the exposure duration of each frame are a function of the video device configuration and are not always known. As patterns are projected onto a display surface 104, their image is captured by the video device 114. It may take some time before captured frames from the video capture method containing a view of the projected pattern become available to a capture process. This method determines this time. Likewise, changing a pattern during continuous video capture may produce incomplete or underexposed views of the calibration test pattern for one or more available video frames. This method ensures that enough delay exists in the process such that frames retrieved from the video capture method and after the delay are best representative of the display pattern and do not exhibit such error.

In this method, the video device capture time or frame number relationship between an exposure event and the associated delivered frame is initially unknown. Temporal video frame averaging may be employed in a camera driver that smoothes changes in a scene (typically used to reduce noise) but can result in a reduced delivery frame rate independent of the device sample rate. Similarly, increasing an exposure level may result in a change to the available frame delivery frequency. These delays can also impact the rate at which calibration test patterns may be gathered.

A goal is to determine an optimal minimal time with which to wait before recording an available captured frame associated with a calibration test pattern and furthering a continuing calibration capture process by updating to a next calibration test pattern. This optimal video capture interval is determined such that a frame grabber process can prepare to record a video frame located at a future time or frame count from a current time or frame counter which will be associated with a calibration capture image projected at the current time or frame counter. The main calibration process may continue with updating or projecting another calibration test pattern at a determined frequency independent of the actual frame storage with confidence that the updating will not affect the as yet to be recorded frame result from a prior calibration test pattern.

Figure 2:
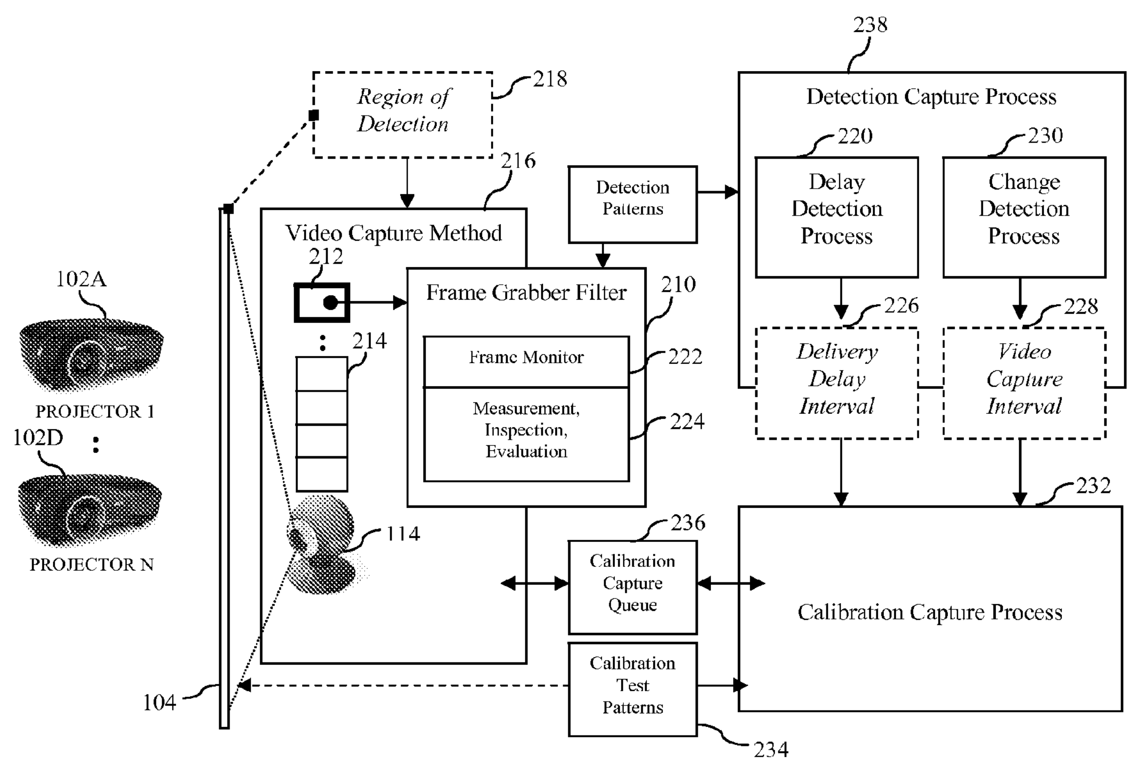
FIG. 2 is a functional overview of the present invention.
Figure 3:
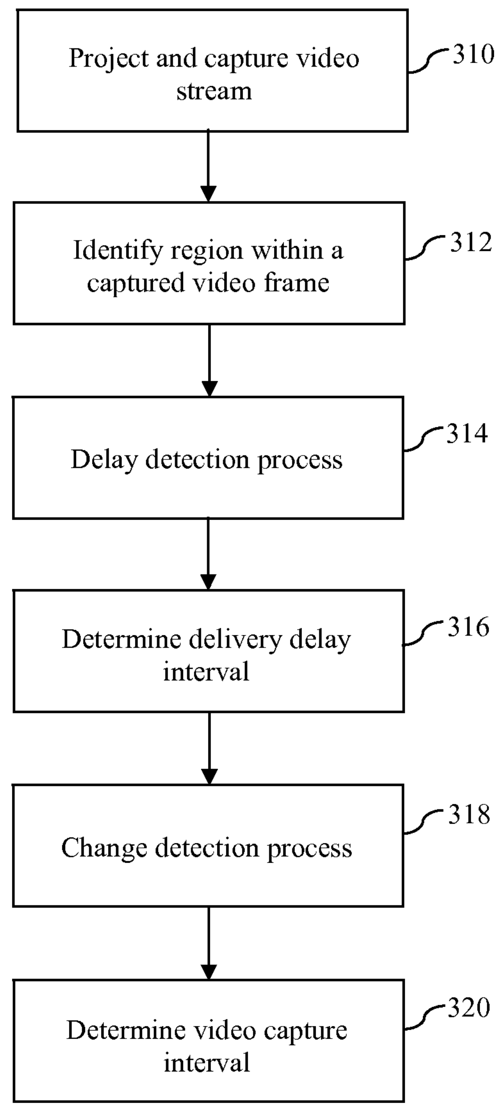
FIG. 3 is a general flow diagram of the method of the present invention.

FIG. 2 is a functional overview of the present invention. Certain functional blocks can be hardware or software or combinations of both, such as projector platform 106 (as a PC) executing program instructions. FIG. 3 is a general flow diagram showing the major steps in the method of the present invention.

The method of present invention method begins by projecting a series of calibration test patterns from one or more projectors 1 to N (i.e. projectors 102A to 102D in FIG. 1) onto screen 104 and initiating capture by a video device (webcam 114) and receiving a capture stream (FIG. 3, step 310). For example, on a Microsoft Windows platform a webcam device 114 may be accessed through a Microsoft DirectX capture filter graph. This filter graph is built and configured with a frame grabber filter interface. Referring to FIG. 2, the frame grabber filter 210 is configured to facilitate retrieval of individual video frames 212 collected from the capture stream 214. The frame grabber filter 210 maintains a time tFn and a counter cFn associated with all frames received. This video capture method (shown as functional block 216) captures and collects frames from the webcam 114, keeping a latest frame 212 for use by a gathering method, but disposing of it and any unused frames as a new frame becomes available.

Next, the method identifies of a region within a captured video frame whose pixels contain a sample portion or view of the projected display surface, which is labeled a region of detection 218 (step 312 in FIG. 3). This may be accomplished through a user interface selection, as within a preview interface for camera alignment, or similar operation. In a preferred embodiment, the region of detection 218 is a rectangular shaped area with normalized position and dimension units so it can be automatically applied to other captured video frames. It will be appreciated that projector platform 106 manipulates the projected output, and thus the pixel content in the region of detection 218 in captured frames will be varied. Identification of a region narrows a pixel inspection range for determining pattern changes.

Delivery Delay Interval—Delay Detection

The method of the present invention continues with a delay detection process 220, which is shown generally as step 314 in FIG. 3. First, a projector 102 outputs a detection pattern with all pixel values having a substantially high luminance component (for example, a maximum luminance all white image) and projector platform 106 records the output time tHO_0. The frame most recently delivered and available to the video capture method, the current video frame, is continually monitored throughout the process. The current video frame time tFn and counter cFn are also recorded as tHF_0 and cHF_0.

Next, a frame monitoring operation 222 is enabled that allows the frame grabber filter 210 to process each video frame received with an inspection of the assigned region of detection 218 within the captured frame 212. Inspection includes identification, measurement of pixels within the assigned region, and evaluation of measurement results (shown as 224 in FIG. 2). Measurement may include computing a mean, an average, frame comparison, or other operation. Results of inspection are recorded with the frame and the monitor operation.

For delay detection, inspection involves measuring a median among the region pixel values and maintaining a short moving median among successive monitoring frames. A rate of change between these measurements is computed. The highest median measured and the lowest median measured are also maintained, i.e. stored in memory. This can be performed by simply storing the first median as the highest and lowest median value and then comparing each new median with the stored highest and lowest and then maintaining or replacing the appropriate highest or lowest stored median value as a result of the comparison.

For delay detection, evaluation monitors when the inspection measurement results indicate the pixels within the region of detection in the captured frame "matches" the detection pattern of interest (i.e. a substantially high luminance condition). Evaluation match is successful when the rate of change measurement is low (e.g. below a small threshold, such as 10% of the change range), the region median is near the highest or lowest median measured (i.e. as a small distance percentage within the range between the highest or lowest median and a midpoint between them, such as within 25% of the range from the median to the midpoint), and the highest and lowest median values are separated by at least a quarter of a luminance range (i.e. if output pixels luminance can range between 0 and 255 units, then input measurements should be separated by at least 255/4 values) or a timeout condition occurs. The timeout condition may typically occur at the start of the process when the content captured before an initial detection pattern closely matches the initial detection pattern. The timeout may be a long interval, such as 20 seconds, or some function of the available frame rate, such as 10×FPS seconds. When the "match" is successful, the identified current frame time tFn and counter cFn results are recorded for the current detection pattern (i.e. tHR_0 and cHR_0).

Next, projector 102 outputs a detection pattern with all pixel values having a substantially low luminance component (for example, a minimum luminance all black image) and records the output time tLO_0 along with the current video frame time tFn and counter cFn as tLF_0 and cLF_0. The enabled monitoring operation inspects for a match to this new detection pattern (i.e. a minimum luminance condition) and again, when successful, the current frame time and counter results are stored as tLR_0 and cLR_0.

The delay detection process repeats for several iterations 'i', collecting and assembling results in a table [(tHO_0, tHF_0, tHR_0, cHF_0, cHR_0), (tHO_i, tHF_i, tHR_i, cHF_i, cHR_i)] and [(tLO_0, tLF_0, tLR_0, cLF_0, cLR_0), (tLO_i, tLF_i, tLR_i, cLF_i, cLR_i)]. A difference between the time of a received frame matching the pattern and detection pattern output time indicates a measurement of delivery delay. For example, tHR_0–tHO_0 indicates a delivery delay. Likewise tLR_0–tLO_0 also measures the delay. Alternately, a delivery delay can be determined as the difference of the frame counter values (i.e. cHR_i–cHF_i) divided by the delivery frame rate. The max delivery delay D(i) is computed with each iteration as a maximum of the individual Hi and Lo delivery delay calculations. Since the startup frame conditions are initially unknown, a moving average of a most recent 'm' computed max delivery delay results (i.e. D(i-m) through D(i)) is computed with each iteration. When a change in the moving average approaches a minimum, the iteration process can stop.

The maximum max delivery delay result among the most recent 'm' iterations is determined to be the delivery delay interval 226 (step 316 in FIG. 3). This ends the delay detection process 220.

Video Capture Interval—Change Detection

The method of the present invention continues with a process to determine a video capture interval, which is not the same as a video capture method frame rate. Initially, the video capture interval is set to an amount of time equal to (or greater than) the delivery delay interval 226. With such setting, a capture method need only wait for a next frame delivery after a delay capture interval to continuing processing. Though this capture approach is possibly slower than an asynchronous approach which uses an optimal video capture interval, the synchronous nature of a "wait until received" capture method may be easier to implement in certain processes.

Typically a safe guess of a default video capture interval 228 is approximately 2 times the output frame rate of the camera. This provides enough headroom to accommodate changes to display content without affecting pixels in gathered frames. However, when a video camera utilizes frame averaging (i.e. to control noise in the frame image) or other processing that impacts individual frames in a temporal manner, individual frames may not be "stable" at a frame rate interval (since several frames may record some aspect of a captured content change before the frame changes are minimized). When this happens, the video capture interval 228 may be much larger.

The method continues with a change detection process 230, which is shown generally as step 318 in FIG. 3. In one embodiment, this process occurs in tandem with the delay detection process 220 after a first max delivery delay result. In FIG. 2, delay detection process 220 and change detection process 230 are shown as part of an overall detection capture process 238. As an initial one-time operation, projector 102 outputs a detection pattern with all pixel values having a substantially low luminance component (for example, a minimum luminance all black image) and the process waits a delivery delay interval (or a max deliver delay result if the delivery delay interval has not yet been established.) This ensures that any received frames available by the video capture method have a region of detection 218 with region pixels values at a substantially low value. This one-time operation is unnecessary if the change detection process 230 immediately follows the delay detection process 220.

First (or following the one-time operation, if performed), projector 102 outputs a detection pattern with all pixel values having a substantially high luminance component (for example, a maximum luminance all white image) and records the output time tHO_0 along with the current video frame time tFn and counter cFn as tHF_0 and cHF_0.

Next, the frame monitoring operation 222 is again enabled. For the change detection process 230, inspection also measures a median among the region pixel values and maintains a short moving median among successive monitoring frames. A rate of change between these measurements is computed. The highest median measured and the lowest median measured are also maintained. Evaluation, however, monitors for two events. The first is when measurement results indicate the capture frame region measurements are beginning to deviate from a prior detection pattern match. The second is when measurements results indicate the captured frame region "matches" the detection pattern of interest (same as with a delay detection process 220). Then the evaluation event detects the measurement result is "changing" from a prior detection pattern. To determine this change, an evaluation measures the rate of change between successive frame median measurements. When the rate of change shows an increase (such as above 10% of the change range), then a measurement result change event has been detected. The current frame time tFn and count tFc results are recorded for the current detection pattern as tHC_0 and cHC_0 at a detection change output time. When the evaluation event detects the measurement result "matching" the detection pattern, the current frame time tFn and counter tFc results are recorded for the current detection pattern (i.e. tHR_0 and cHR_0).

Next, projector 102 outputs a detection pattern with all pixel values having a substantially low luminance component (for example, a minimum luminance all black image) and records the output time tLO_0 along with the current video frame time tFn and counter cFn as tLF_0 and cLF_0. The enabled monitoring operation awaits successful evaluations. When the "changing" evaluation is successful, the current frame time and counter results are stored as tLC_0 and cLC_0. When the "matching" evaluation is successful, they are stored as tLR_0 and cLR_0.

Like the delay detection process 220, the change detection process 230 repeats for several iterations 'i', collecting and assembling results in a table [(tHO_0, tHF_0, tHR_0, cHF_0, cHR_0, tHC_0, cHC_0), (tHO_i, tHF_i, tHR_i, cHF_i, cHR_i, tHC_i, cHC_i)] and [(tLO_0, tLF_0, tLR_0, cLF_0, cLR_0, tLC_0, cLC_0), (tLO_i, tLF_i, tLR_i, cLF_i, cLR_i, tLC_i, cLC_i)]. A difference between the time of a received frame matching the pattern and a detection change output time indicates a measurement of change interval. For example, tHR_0–tHC_0 indicates a change interval. Likewise tLR_0–tLC_0 also measures the change interval. Alternately, a change interval can be determined as the difference of the frame counter values (i.e. cHR_i–cHC_i) divided by the delivery frame rate. The max change interval C(i) is computed with each iteration as a maximum of the individual Hi and Lo change interval calculations. Since the startup frame conditions are initially unknown, a moving average of a most recent 'm' computed max change interval results (i.e. C(i-m) through C(i)) is computed with each iteration. When a change in the moving average approaches a minimum, the iteration process can stop.

The maximum max change interval result among the most recent 'm' iterations is determined to be the video capture interval (FIG. 3, step 320). This ends the change detection process.

The video capture interval 228 and delivery delay interval 226 of the present invention are suited for use in a calibration capture process 232, described for example in commonly owned U.S. patent applications Ser. No. 12/728,838, and Ser. No. 12/549,011. In such process calibration test patterns 234, stored in a memory, for example, are used by the calibration process for projection by projector(s) 102 onto screen 104. These projected images are captured by camera 114 and stored in a calibration capture queue 236 for evaluation.

Figure 4:
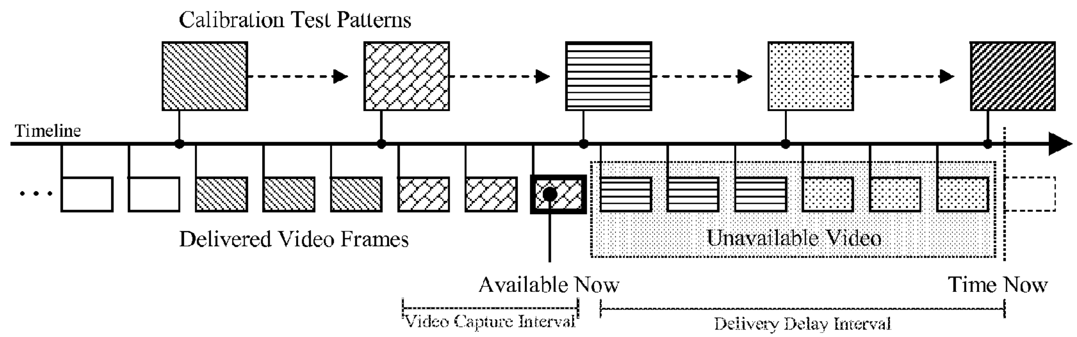
FIG. 4 illustrates a sample timeline calibration capture process history.

FIG. 4 illustrates a sample timeline calibration capture process history. The Timeline vector of FIG. 4 points toward a future time (right) and lists a brief history of past events spanning a time in the recent past (left) up through a current time, Time Now. Events are listed according to the point in time that they occurred. They include when there was a change in the calibration test pattern output 234 onto a display surface 104 and when video frames were made available by camera 114. The Available Now frame represents the most recent video frame available and delivered by the camera in a video capture method. The Unavailable Video block represents data buffers, transfer operations, compression, decompression, or other steps between a Time Now and when a frame is available to the video capture method. The sample rate and other characteristics within this interval are unknown but depicted with a constant frame rate. For example, temporal frame averaging may occur within this block and the available frame rate to the video capture method may be lower than the actual device capture rate. For computing delay intervals using a frame counter, it is assumed that the delivery frame rate from the camera to the video capture method is constant. The delivery delay interval shown reveals the time necessary before a change in calibration test pattern will become available. The video capture interval shown provides a shorter interval than the delivery delay interval.

Figure 5:
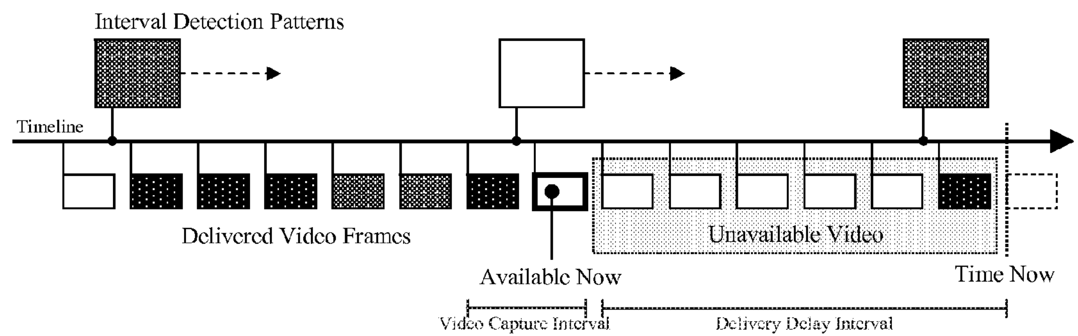
FIG. 5 illustrates an interval detection process history.

FIG. 5 illustrates an interval detection process history. After several iterations of dark and light detection patterns, this method has computed the shown delivery delay interval and video capture interval. When used by a capture process, display pattern content shall be updated no faster than the video capture interval 228 to ensure frames contain proper capture results. To aid performance, content can be changed and displayed at the video capture interval with the initial captured content arriving after a delivery delay interval 226 with following content arriving at each video capture interval thereafter. For performance, content displayed should be changed at a rate no slower than the delivery delay interval 226. The period from a first content display to a first associated captured frame at the available now time will be the delivery delay interval 226 and will mark a content arrival start time. The time from a first content display to a second content display shall be the interval from a content start time to a next used captured frame. This interval shall be no smaller that the video capture interval 228.

Figure 6:
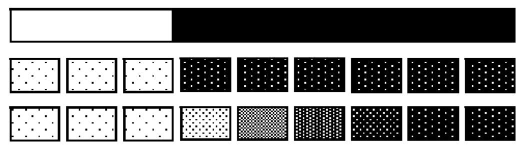
FIG. 6 illustrates a video capture frame change frequency.

FIG. 6 illustrates a video capture frame change frequency. In FIG. 6, an interval of time is represented and a top row shows a display signal with an abrupt change in output pattern from a light value to a dark value. Video frames gathered from two different devices capturing this output pattern are presented in a middle and lower row. The middle row from a first device demonstrates quick frame response to the change in pattern with the change fully represented between two successively captured video frames. The device for the lower row, however, required five capture intervals (frame sampling points) before the pattern change was more closely represented in a captured frame. In this example, the video capture interval 228 for the first capture device can be much shorter than the video capture interval 228 for the second capture device. Thus, determining the Delivery Delay Interval 226 and the Video Capture Interval 228 for a particular image capturing device, e.g. camera, is important to an accurate calibration capture process 232.

Figure 7:
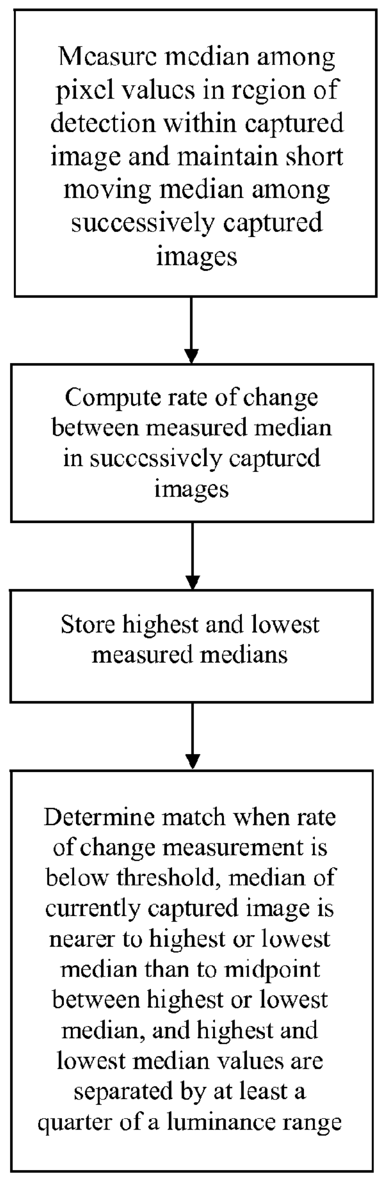
FIGS. 7 and 8 are flow diagrams illustrating further detail on the delay detection process.
Figure 8:
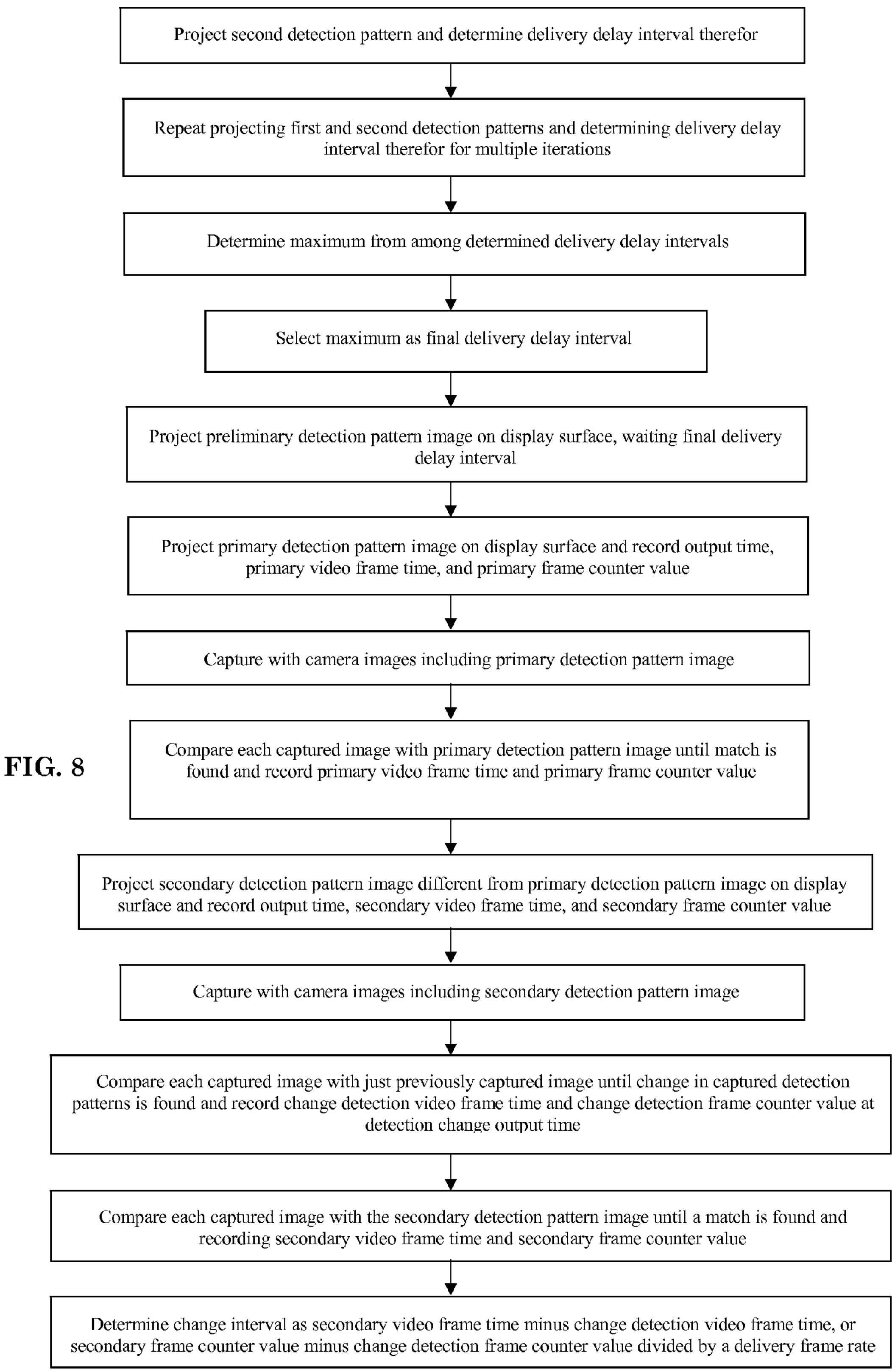

FIGS. 7 and 8 are flow diagrams illustrating details on the delay detection process previously described.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for determining a delivery delay interval between projecting an image and delivering the image, comprising:

projecting a first detection pattern image on a display surface and recording an output time, a first video frame time, and a first frame counter value;

capturing with a camera a plurality of images including the projected first detection pattern image;

comparing each of the plurality of captured images with the first detection pattern image until a match is found and recording a second video frame time and a second frame counter value; and determining a delivery delay interval as:

the second video frame time minus the first video frame time, or the second frame counter value minus the first frame counter value divided by a delivery frame rate.

2. A method as in claim 1 further comprising:

identifying a region of detection within a captured image whose pixels contain a sample portion of the display surface.

3. A method as in claim 1, wherein the comparing comprises:

measuring a median among pixel values in the region of detection within a captured image and maintaining a short moving median among successively captured images.

4. A method as in claim 3 further comprising:

computing a rate of change between the measured median in successively captured images.

5. A method as in claim 4 further comprising:

storing a highest median measured and a lowest median measured.

6. A method as in claim 5 wherein a match is determined to be found when the rate of change measurement is below a threshold, the median of the currently captured image is nearer to the highest or lowest median measured than to a midpoint between the highest or lowest median measured, and the highest and lowest median values are separated by at least a quarter of a luminance range.

7. A method as in claim 1 further comprising:

projecting a second detection pattern that is different than the first detection pattern and determining a delivery delay interval for the second detection pattern, repeating projecting first and second detection patterns and determining a delivery delay interval for the first and second detection patterns for a plurality of iterations, and determining a maximum from among the determined delivery delay intervals, and selecting the maximum as a final delivery delay interval.

8. A method as in claim 7 further comprising:

after selecting the final delivery delay interval, projecting a preliminary detection pattern image on the display surface, waiting the final delivery delay interval, and then projecting a primary detection pattern image on the display surface and recording an output time, a primary video frame time, and a primary frame counter value;

capturing with a camera a plurality of images including the primary detection pattern image;

comparing each of the plurality of captured images with the primary detection pattern image until a match is found and recording a primary video frame time and a primary frame counter value;

projecting a secondary detection pattern image that is different from the primary detection pattern image on the display surface and recording an output time, a secondary video frame time, and a secondary frame counter value;

capturing with a camera a plurality of images including the secondary detection pattern image;

comparing each of the plurality of captured images with a just previously captured image until a change in captured detection patterns is found and recording a change detection video frame time and a change detection frame counter value at a detection change output time;

comparing each of the plurality of captured images with the secondary detection pattern image until a match is found and recording a secondary video frame time and a secondary frame counter value; and determining a change interval as:

the secondary video frame time minus the change detection video frame time or the secondary frame counter value minus the change detection frame counter value divided by a delivery frame rate.

9. Apparatus for determining a delivery delay interval between projecting an image and delivering the image, comprising:

a projector that projects an image onto a display surface;

the projector projecting a first detection pattern image on the display surface and a processor that records an output time, a first video frame time, and a first frame counter value;

a camera that captures a plurality of images including the first detection pattern image; and the processor further:

compares each of the plurality of captured images with the first detection pattern image until a match is found and records a second video frame time and a second frame counter value; and determines a delivery delay interval as:

the second video frame time minus the first video frame time, or the second frame counter value minus the first frame counter value divided by a delivery frame rate.

10. An apparatus as in claim 9 wherein the processor further:

identifies a region of detection within a captured image whose pixels contain a sample portion of the display surface.

11. An apparatus as in claim 9, wherein comparing by the processor comprises:

measuring a median among pixel values in the region of detection within a captured image and maintaining a short moving median among successively captured images.

12. An apparatus as in claim 11 wherein the processor further:

computes a rate of change between the measured median in successively captured images.

13. An apparatus as in claim 9 wherein:

the projector further projects a second detection pattern that is different than the first detection pattern and determines a delivery delay interval for the second detection pattern, repeats projecting first and second detection patterns and determining a delivery delay interval for the first and second detection patterns for a plurality of iterations, and determines a maximum from among the determined delivery delay intervals, and selects the maximum as a final delivery delay interval.

14. An apparatus as in claim 13 wherein:

after selecting the final delivery delay interval by the processor, the projector further:

projects a preliminary detection pattern image on the display surface, waits the final delivery delay interval, and then projects a primary detection pattern image on the display surface and the processor records an output time, a primary video frame time, and a primary frame counter value;

the camera captures a plurality of images including the primary detection pattern image;

the processor compares each of the plurality of captured images with the primary detection pattern image until a match is found and records a primary video frame time and a primary frame counter value;

the projector projects a secondary detection pattern image that is different from the primary detection pattern image on the display surface and the processor records an output time, a secondary video frame time, and a secondary frame counter value;

the camera captures a plurality of images including the secondary detection pattern image;

the projector compares each of the plurality of captured images with a just previously captured image until a change in captured detection patterns is found and records a change detection video frame time and a change detection frame counter value at a detection change output time;

the projector compares each of the plurality of captured images with the secondary detection pattern image until a match is found and records a secondary video frame time and a secondary frame counter value; and the processor determines a change interval as:

the secondary video frame time minus the change detection video frame time or the secondary frame counter value minus the change detection frame counter value divided by a delivery frame rate.

15. A tangible computer-readable medium embodying instructions executable by a computer to perform a method of determining a delivery delay interval between projecting an image and delivering the image, the method comprising:

projecting a first detection pattern image on a display surface and recording an output time, a first video frame time, and a first frame counter value;

capturing with a camera a plurality of images including the projected first detection pattern image;

comparing each of the plurality of captured images with the first detection pattern image until a match is found and recording a second video frame time and a second frame counter value; and determining a delivery delay interval as:

the second video frame time minus the first video frame time, or the second frame counter value minus the first frame counter value divided by a delivery frame rate.

16. A tangible computer-readable medium as in claim 15, wherein the method further comprises:

identifying a region of detection within a captured image whose pixels contain a sample portion of the display surface.

17. A tangible computer-readable medium as in claim 15, wherein the method further comprises:

measuring a median among pixel values in the region of detection within a captured image and maintaining a short moving median among successively captured images.

18. A tangible computer-readable medium as in claim 17 wherein the method further comprises:

computing a rate of change between the measured median in successively captured images.

19. A tangible computer-readable medium as in claim 15 wherein the method further comprises:

projecting a second detection pattern that is different than the first detection pattern and determining a delivery delay interval for the second detection pattern, repeating projecting first and second detection patterns and determining a delivery delay interval for the first and second detection patterns for a plurality of iterations, and determining a maximum from among the determined delivery delay intervals, and selecting the maximum as a final delivery delay interval.

20. A tangible computer-readable medium as in claim 19 wherein the method further comprises:

after selecting the final delivery delay interval, projecting a preliminary detection pattern image on the display surface, waiting the final delivery delay interval, and then projecting a primary detection pattern image on the display surface and recording an output time, a primary video frame time, and a primary frame counter value;

capturing with a camera a plurality of images including the primary detection pattern image;

comparing each of the plurality of captured images with the primary detection pattern image until a match is found and recording a primary video frame time and a primary frame counter value;

projecting a secondary detection pattern image that is different from the primary detection pattern image on the display surface and recording an output time, a secondary video frame time, and a secondary frame counter value;

capturing with a camera a plurality of images including the secondary detection pattern image;

comparing each of the plurality of captured images with a just previously captured image until a change in captured detection patterns is found and recording a change detection video frame time and a change detection frame counter value at a detection change output time;

comparing each of the plurality of captured images with the secondary detection pattern image until a match is found and recording a secondary video frame time and a secondary frame counter value; and determining a change interval as:

the secondary video frame time minus the change detection video frame time or the secondary frame counter value minus the change detection frame counter value divided by a delivery frame rate.

* * * * *